Figure 1:
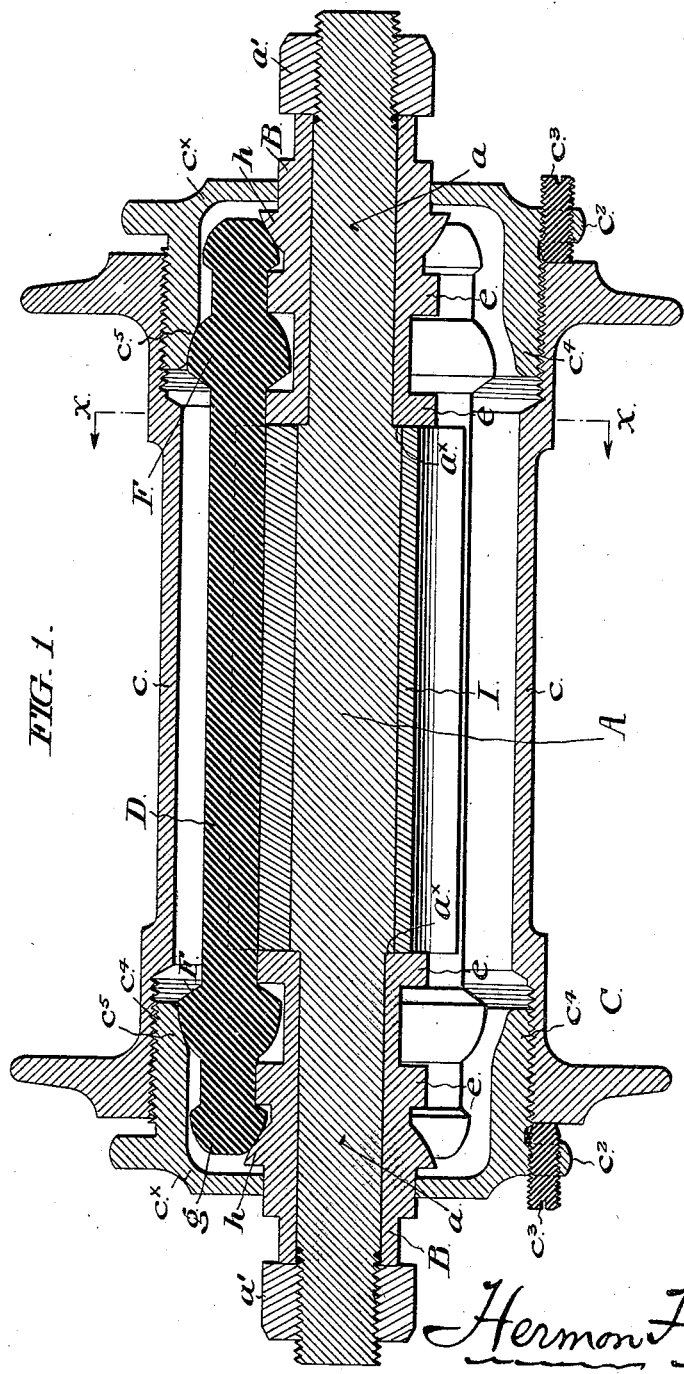

(No Model.)

2 Sheets—Sheet 1.

H. HINCKLEY.
BEARING.

No. 515,336.

Patented Feb. 27, 1894.

WITNESSES:
F. Norman Dixon
Montgomery Russell

Hermon Hinckley
INVENTOR
By his Attorneys
Bonsall Taylor (No Model.) 2 Sheets—Sheet 2.
H. HINCKLEY.
BEARING.
No. 515,336. Patented Feb. 27, 1894.
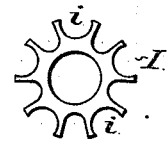
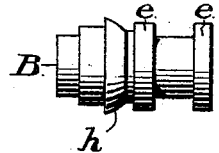
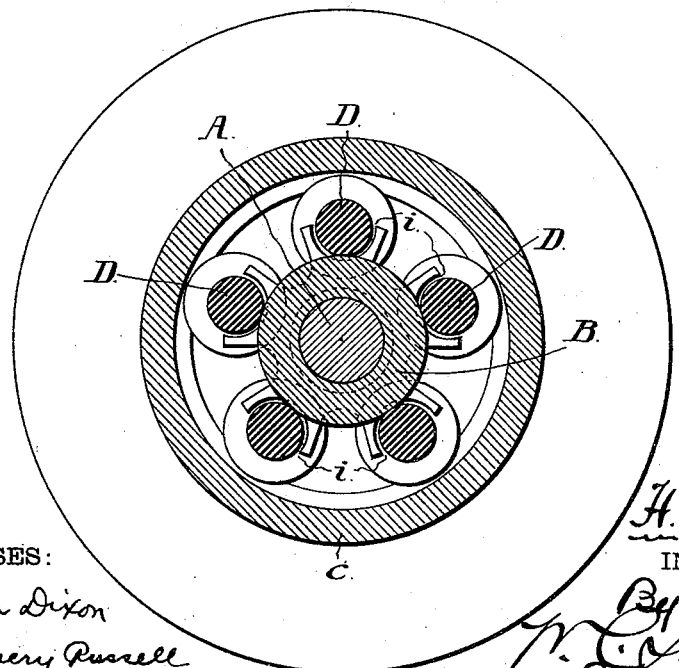
WITNESSES:
F. Norman Dixon
Montgomery Russell
H. Hinckley
INVENTOR
By his Attorney

UNITED STATES PATENT OFFICE.

HERMON HINCKLEY, OF WILLIAMSPORT, PENNSYLVANIA.

BEARING.

SPECIFICATION forming part of Letters Patent No. 515,336, dated February 27, 1894.

Application filed April 8, 1893. Serial No. 469,566. (No model.)

*To all whom it may concern:*

Be it known that I, HERMON HINCKLEY, a citizen of the United States, residing at Williamsport, in the county of Lycoming and State of Pennsylvania, have invented certain new and useful Improvements in Bearings, of which the following is a specification.

My invention relates especially to roller bearings employed in connection with the axles of bicycles and other vehicles, but it is of general utility in connection with all classes of bearings.

It is the object of my invention to provide a roller bearing of a compact and simple form, in which the parts are so constructed and arranged that the rollers will under all circumstances be maintained in an equidistant relationship,—that wear of the parts will not affect the working efficiency of the device,—that very perfect compensation for wear may be made by a simple adjustment of the parts,—that the maximum reduction of friction will be effected,—and that wear will be reduced to the minimum.

In the accompanying drawings I illustrate and herein I describe a good form of a convenient embodiment of my invention, the particular subject-matter claimed as novel being hereinafter definitely specified.

In the accompanying drawings, Figure 1 is a central vertical longitudinal sectional elevation of a hub and axle shown as equipped with my improved roller bearing. Fig. 2 is a view in side elevation, and Fig. 3 a view in end elevation, of the separator. Fig. 4 is a view in side elevation of the axle bar,—Figs. 5 and 6 of the counterpart shells,—and Fig. 7 of a roller. Fig. 8 is a transverse vertical sectional elevation of the structure shown in Fig. 1, section being supposed upon the dotted line $x$—$x$ of said figure.

Similar letters of reference indicate corresponding parts.

In the drawings, A is the main axle bar, the extremital portions $a\ a$ of which are of slightly less diameter than the central portion,—and B B are a pair of counterpart annular shells mounted respectively upon the portions $a\ a$ of said axle bar, and bearing as to their inner ends against the shoulders $a^\times$ of the same. Nuts $a'$ are mounted upon the protruding extremities of the axle bar, and, bearing against said shells, bind the latter firmly against the shoulders, so that the shells and the axle bar are fixed with respect to each other, and as so fixed constitute the axle upon or with relation to which the other parts of the device have movement of rotation.

C is the hub casing, consisting conveniently of the cylindrical barrel $c$, the respective extremities of which are internally threaded to receive correspondingly externally threaded caps $c^\times$, which, as usual, embody axial openings through which the respective extremities of the axle extend. Each cap is provided with a peripheral extension $c^2$ embodying a threaded longitudinal aperture in which is mounted a set screw $c^3$ adapted to be advanced into contact with the end or lip of the barrel $c$ to lock said cap in any position of adjustment; any suitable locking device may, however, be adopted in its stead.

D are a series of rollers shown as extending from end to end of the hub and interposed between and treading respectively against the axle and the hub. The portions of the axle with which the rollers make contact and upon which in their movement they tread, are the peripheral surfaces of circumferential external ribs $e$ situated at or near the respective extremities of the axle, and which, as a matter of convenience of construction, are preferably formed, as shown, as integral parts of the counterpart shells hereinbefore referred to. I prefer to provide two of these ribs at each extremity of the axle. The portions of the roller which are abreast these ribs and which rest upon or tread against their peripheral surfaces, and also the peripheries of the ribs themselves, are preferably in the form of circular or cylindrical planes, in order that in the continued use of the device such wear of the parts as does occur effects merely a uniform reduction of the respective diameters, which may be compensated for by setting the rollers more closely to the ribs. The inner faces of the caps happen in the form shown in the drawings, to constitute the portions of the hub casing with which the rollers are in contact or upon which they tread, said caps being in the preferred embodiment of my invention respectively provided with an inwardly extending circular lip $c^4$,—which causes them to be internally of an approximately hemispherical form.

Each roller D is provided at each of its respective extremities, with what I term an inclined bearing rib F, each of said ribs being at one side from its line of greatest circumference to its base inclined obliquely with relation to the axis of the axle, and as to such side slightly convex in profile. The rollers D tread outwardly through the convex surfaces of their respective inclined bearing ribs upon or against the inner faces of the respective caps of the hub, which inner faces are shown as provided with slightly concave tapering portions constituting tread surfaces $c^5$; these tread faces may however be straight inclined surfaces, or be outwardly curved, presenting convex faces. The respective extremities of the rollers are provided with small hemispherical knobs $g$, the outwardly-facing convex portions of which abut against correspondingly opposite stop collars $h$, as I term them, formed upon the axle and having inwardly-facing inclined convex sides as illustrated. The point of contact between the knob $g$ and stop collar $h$ is in line with the peripheries of the ribs $e$, which arrangement insures that in each revolution of the rollers the same distance is traveled by a knob on the stop collar $h$ as by the cylindrical part of a roller on a rib $e$, thus avoiding any slip of parts.

Mounted upon the central portion of the axle is a device which I term a separator, I, the same being, in the form shown, a sleeve mounted for revolution upon said axle, and provided with a series of longitudinal grooves or roller seats $i$, somewhat larger in diameter than the rollers, corresponding in number with the rollers employed, and in which respectively the rollers are seated, to the end that the rollers may be retained at equal distances apart around the hub and in parallelism with the axis of the axle. The grooves are made of a sufficient depth to prevent contact between the rollers and their bottoms when the rollers are drawn radially inward by adjusting to take up wear.

In the tightening up of the nuts $a'$ to secure the shells B in position, the contact of the latter against the axle shoulders $a^x$ prevents them from binding against the separator,—the length of which is less than the distance between said shoulders.

The operation of the hub or bearing will be readily understood: Rotation being imparted to the wheel and hub, the latter is revolved about the axle, friction being diminished by the presence of the rollers. The movement or rotation of the rollers upon their axes, and their consequent travel upon the ribs $e$ is due to the driving action of the inner face of the hub upon the bearing faces of the ribs F, and the said ribs F which thus receive the power, so to speak, being considerably greater in diameter than those portions of the rollers which tread upon the ribs $e$, a leverage is secured for the driving action of the hub upon the rollers, which is greater than would exist were the rollers of uniform diameter throughout their lengths, with the result that the movement of the hub is rendered easier in proportion to the increased leverage. As will be understood from an inspection of the drawings, the wear upon the rollers due to their tread upon the hub casing comes only upon certain portions of their lengths, while that due to their tread upon the axle comes upon other or different portions of their lengths, a distribution resulting in increased durability. In other words, that portion of the length of a roller which is in contact with the axle is not in contact with the hub casing,—while that portion of the length of a roller which is in contact with the hub casing is not in contact with the axle. The stop collars $h$ against which the knobs or enlargements $g$ abut, resist end thrust of the rollers and therefore operate to retain the latter in proper longitudinal position; while the separator, which in the revolution of the hub is carried with the rollers around the axle, retains said rollers in proper lateral position. When, in the continued use of the device, the rollers or the portions of the axle or hub upon which they tread become worn, the wear, owing to the bearing faces of the inclined ribs F and the inner faces of the hubs being both inclined or, so to speak, tapering, as described, may be taken up by the screwing up of one or both of the said caps, the result of which will be to, first, carry the inner faces of the caps, if they should be out of contact, against the faces of the inclined ribs, and then to set or carry all the rollers, if they should be out of contact, radially inward against the faces of said ribs.

Having thus described my invention, I claim and desire to secure by Letters Patent—

1. In a bearing, in combination, a hub casing, provided with interior inclined tread faces, an axle provided with circumferential ribs, and a series of rollers disposed about said axle and bearing against said ribs, said rollers being provided with ribs having inclined faces, and being in contact, through said inclined faces alone, with the tread faces of the hub casing, substantially as set forth.

2. In a bearing, in combination, a hub casing provided with adjustable caps having interior inclined tread faces, an axle provided with circumferential ribs, and a series of rollers disposed about said axle and bearing against said ribs, said rollers being provided with ribs having inclined faces, and being in contact, through said inclined faces alone, with the tread faces of the hub casing, substantially as set forth.

3. In a bearing, in combination, a hub casing provided with interior inclined tread faces, an axle provided with circumferential ribs, a series of rollers disposed about said axle and bearing against said ribs, said rollers being provided with ribs having inclined faces, and being in contact, through said inclined faces alone, with the tread faces of the hub casing, and a separator which maintains said rollers in equi-distant relationship, substantially as set forth.

4. In a bearing, in combination, a hub casing provided with interior inclined tread faces, an axle provided with circumferential ribs, and with a pair of inclined stop collars, a series of rollers disposed about said axle, and bearing against the ribs of said axle, said rollers being provided with inclined extremital enlargements adapted to make contact with the stop collars, and also provided with ribs having inclined faces through which inclined faces alone said rollers are in contact with the hub casing, substantially as set forth.

5. In a bearing, in combination, a hub having screw caps adapted to be moved inward to take up wear and formed each with an interior tapering tread face, an axle provided with tread faces, and a series of rollers disposed about said axle in contact with its tread faces and provided with inclined ribs adapted to tread upon the tread faces of the caps, substantially as set forth.

6. In a bearing, in combination, a hub having screw caps adapted to be moved inward to take up wear and formed each with an interior tread face, an axle provided with circumferential ribs formed with plane peripheral faces, and a series of rollers disposed about said axle and formed with plane cylindric surfaces adapted to tread upon said peripheral faces, and likewise with ribs possessing inclined convex faces adapted to make contact with the tread faces of the caps, substantially as set forth.

7. In a bearing, in combination, a hub having screw caps adapted to be moved inward to take up wear and formed each with an interior tread face, an axle provided with circumferential ribs formed with plane peripheral faces, a series of rollers disposed about said axle and formed with plane cylindric surfaces adapted to tread upon said peripheral faces, and likewise with ribs possessing inclined convex faces adapted to make contact with the tread faces of the caps, and a separator rotatably mounted upon the axle and embodying grooves or seats for the reception of the rollers, substantially as set forth.

8. In combination, an axle embodying four ribs having plane peripheral faces, and also embodying a pair of stop collars,—a hub having screw caps at its respective extremities which caps embody tread faces,—and a series of rollers each provided with cylindric portions in tread upon the plane peripheral faces of the ribs, with extremital enlargements in tread upon the stop collars, and with two ribs having each an inclined convex face which faces are respectively in tread upon the corresponding tread faces of the caps, substantially as set forth.

9. In combination, an axle embodying four ribs having plane peripheral faces, and also embodying a pair of stop collars,—a hub having screw caps at its respective extremities which caps embody interior tread faces,—a series of rollers which are provided with cylindric portions in tread upon the plane peripheral faces of the ribs, with extremital enlargements in tread upon the stop collars, and with two ribs having each an inclined convex face which faces are respectively in tread upon the corresponding tread faces of the caps, and a separator surrounding the axle and embodying seats for the reception of said rollers, substantially as set forth.

In testimony that I claim the foregoing as my invention I have hereunto signed my name this 28th day of March, A. D. 1893.

HERMON HINCKLEY.

In presence of—
JOHN G. RUDING, Jr.,
ROBERT F. ALLEN.